United States Patent
Klingman et al.

(10) Patent No.: US 7,376,958 B1
(45) Date of Patent: May 20, 2008

(54) METHOD AND APPARATUS FOR HONORING CORBA TRANSACTION REQUESTS BY A LEGACY DATA BASE MANAGEMENT SYSTEM

(75) Inventors: Vance Jay Klingman, St. Anthony, MN (US); Jeremy A. Freed, Francesville, IN (US)

(73) Assignee: Unisys Corporation, Blue Bell, PA (US)

( * ) Notice: Subject to any disclaimer, the term of this patent is extended or adjusted under 35 U.S.C. 154(b) by 727 days.

(21) Appl. No.: 10/166,239

(22) Filed: Jun. 6, 2002

(51) Int. Cl.
  *G06F 9/54* (2006.01)
  *G06F 9/44* (2006.01)
  *G06F 9/46* (2006.01)
  *G06F 15/16* (2006.01)

(52) U.S. Cl. .................. 719/316; 719/315; 719/330

(58) Field of Classification Search .............. 719/316, 719/330, 315
  See application file for complete search history.

(56) References Cited

U.S. PATENT DOCUMENTS

| | | | | |
|---|---|---|---|---|
| 6,138,169 | A * | 10/2000 | Freund et al. | 719/313 |
| 6,151,637 | A * | 11/2000 | Phillips et al. | 709/201 |
| 6,157,927 | A * | 12/2000 | Schaefer et al. | 707/103 R |
| 6,212,546 | B1 * | 4/2001 | Starkovich et al. | 709/203 |
| 6,243,862 | B1 * | 6/2001 | Lebow | 717/131 |
| 6,272,675 | B1 * | 8/2001 | Schrab et al. | 717/100 |
| 6,405,246 | B1 * | 6/2002 | Hutchison | 709/221 |
| 6,453,320 | B1 * | 9/2002 | Kukura et al. | 707/103 R |
| 6,519,652 | B1 * | 2/2003 | Sadiq | 719/316 |
| 6,757,899 | B2 * | 6/2004 | Zhdankin et al. | 719/315 |
| 6,907,609 | B1 * | 6/2005 | Kukura et al. | 719/316 |
| 6,973,657 | B1 * | 12/2005 | Ahmad et al. | 719/315 |
| 6,981,265 | B1 * | 12/2005 | Rees et al. | 719/313 |
| 2002/0124113 | A1 * | 9/2002 | Gargya et al. | 709/246 |

OTHER PUBLICATIONS

Liang et al., "OMG Object Transaction Service based on an X/Open and ISO OSI TP Kernel," 1997, IEEE, pp. 110-119.*
Froidevaux et al., "The Mainframe as a High-Available, Highly Scalable CORBA Platform," 1999, IEEE Computer Society, 7 pages.*

* cited by examiner

*Primary Examiner*—Li B Zhen
(74) *Attorney, Agent, or Firm*—Charles A. Johnson; Robert Marley; Nawrocki, Rooney & Sivertson PA

(57) ABSTRACT

An apparatus for and method of permitting a CORBA user terminal to request services from an enterprise server having XATMI applications. The service request is generated and transmitted in accordance with CORBA protocol as an IIOP message. A CORBA adapter makes the data format conversions. The request is honored by the enterprise server and a response is generated. The response is converted to CORBA protocol and transferred to the user terminal. Unlike previous and less efficient approaches, the CORBA Naming Service of the CORBA Object Request Broker does not initialize any CORBA objects at server startup. Instead, individual CORBA objects are not initialized until actual use is required.

14 Claims, 7 Drawing Sheets

METHOD AND APPARATUS FOR HONORING CORBA TRANSACTION REQUESTS BY A LEGACY DATA BASE MANAGEMENT SYSTEM

CROSS REFERENCE TO CO-PENDING APPLICATIONS

The present application is related to U.S. patent application Ser. No. 10/164,748, filed Jun. 6, 2002, entitled "MECHANISM FOR CONVERTING CORBA OBJECT REQUESTS TO NATIVE XATMI SERVICE REQUESTS"; U.S. patent application Ser. No. 09/570,701, filed May 15, 2000, entitled "CORBA ACCESS TO SERVICES"; U.S. patent application Ser. No. 09/310,717, filed May 12, 1999, entitled "A GENERIC DCOM SERVER"; U.S. patent application Ser. No. 09/164,932, filed Oct. 1, 1998, entitled "A MULTI-USER CUSTOMIZED DCOM GATEWAY FOR AN OLTP ENTERPRISE SERVER APPLICATION"; U.S. patent application Ser. No. 09/400,647, filed Sep. 21, 1999, entitled "WEBTX MESSAGE QUEUE SYSTEM"; and now issued U.S. Pat. No. 6,397,220, entitled "A COMMON GATEWAY WHICH ALLOWS APPLETS TO MAKE PROGRAM CALLS TO OLTP APPLICATIONS EXECUTING ON AN ENTERPRISE SERVER"; which are assigned to the assignee of the present invention and incorporated herein by reference.

BACKGROUND OF THE INVENTION

1. Field of the Invention

The present invention relates to methods and apparatus for facilitating on-line processing requests, and more specifically, to a more efficient way to honor CORBA service requests to access existing enterprise applications.

2. Description of the Prior Art

The methods by which companies conduct business with their customers are undergoing fundamental changes, due in large part to World Wide Web technology. In addition, the same technology that makes a company accessible to the world, may be used on internal company networks for conducting operational and administrative tasks.

One of the technologies underlying the World Wide Web is the prospect of using component software technology—the idea of breaking large, complex software applications into a series of pre-built and easily developed, understood, and changed software modules called components—as a means to deliver software solutions much more quickly and at a lower cost The goal is to achieve economies of scale for software deployment across the industry.

DCOM is a proprietary technology of Microsoft Corporation and is only applicable to Windows based applications. Therefore, there is a need for a much more generalized and universal component architecture to accommodate a wide range of hardware and operating system platforms. Common Object Request Broker Architecture or "CORBA" is indeed such an approach. CORBA was developed through the efforts of a number of interested companies and agencies. Thus, CORBA provides a technique for the development of software systems.

This component architecture for building software applications will enable this by: 1) speeding development—enabling programmers to build solutions faster by assembling software from pre-built parts; 2) lowering integration costs—providing a common set of interfaces for software programs from different vendors means less custom work is required to integrate components into complete solutions; 3) improving deployment flexibility—making it easier to customize a software solution for different areas of a company by simply changing some of the components in the overall application; and 4) lowering maintenance costs—isolating software function into discreet components provides a low-cost, efficient mechanism to upgrade a component without having to retrofit the entire application.

A distributed component architecture applies these benefits across a broader scale of multiuser applications. CORBA has several strengths that make it a key technology for achieving this. CORBA works easily with Internet technologies like TCP/IP, the Java language, and the HTTP network protocol, providing "object glue" that will enable business applications to work across the Web. CORBA is also an open technology that runs on multiple platforms.

CORBA has its roots as an alternative to Microsoft's DCOM object technology, which has evolved over the last decade from DDE (Dynamic Data Exchange, a form of messaging between Windows programs), OLE (Object Linking and Embedding, embedding visual links between programs within an application), COM (the Component Object Model, used as the basis for all object binding), and ActiveX (COM enabled for the Internet). In addition to all of the DCOM capabilities, CORBA is applicable to other non-Windows operating systems. As stated earlier, applications built from components are simply easier to debug and evolve than large, monolithic applications.

The logical boundary for component applications is no longer on a single machine. Businesses want to leverage the benefits of component development across a broader set of shared applications that operate on multiple machines. These types of applications are referred to as "three-tier" or "n-tier" applications, where "tiers" of application logic, presentation services, business services, and information retrieval and management services, are broken into different components that can communicate directly with each other across a network. To the end user, these applications appear as a seamless extension of their existing desktop environment.

The simplicity, ubiquity, and industry momentum of standard Internet protocols like HTTP make it an ideal technology for linking components together for applications that span machine boundaries. HTTP is easy to program, is inherently cross-platform, and supports an accessible, universal naming service. Much of the excitement around the Java language derives from its potential as a mechanism to build distributed component applications on the Internet. In addition to Java support, CORBA enables components written in other languages, including C, COBOL, Basic, and Pascal, to communicate over the Internet, providing a growth path for existing applications to support Web technology.

As distributed component architectures, such as CORBA, are making their mark as a technology that enables software components to communicate directly with each other across networks, many businesses have a wealth of information that is managed by prior art data base management systems such as DMS, RDMS, DB2, Oracle, Ingres, Sybase, Informix, and many others. In addition, many of the database management systems are available as resources in a larger transaction processing system.

One key to the future success of a business may lie in its ability to capitalize on the ability to interconnect a distributed component architecture, such as CORBA, with existing enterprise systems having applications developed in accordance with the XATMI standard. It defeats the two main goals of component-based development, fast time-to-market and lower development costs, if companies are forced to "hand code" into their component applications the mission critical services that are required for online production systems. Therefore, the leading system suppliers have developed commercially available "middleware" to link web based work stations with existing XATMI systems.

However, most existing XATMI systems have been developed under the assumption that user work stations are physically, electrically, and functionally dedicated exclusively to providing communication between the XATMI and a single user during an entire user session period. This assumption arose at a time in which user work stations were simply dumb video display/keyboard devices connected directly to the XATMI mainframe via a dedicated electrical line.

Modern work stations, however, are extremely complex and capable of substantial unassisted data processing. Furthermore, the internet connection between a modern work station and the XATMI enterprise system is anything but physically, electrically, and functionally dedicated exclusively to a single user session.

A particular difficulty in structuring the conversion of CORBA requests is the need to initialize all potential CORBA objects upon start up of the server. This tends to slow the process and may be costly in terms of the resources which must be dedicated to the initialization.

SUMMARY OF THE INVENTION

The present invention overcomes many of the disadvantages associated with the prior art by providing a method and apparatus to configure a CORBA server objects in the CORBA Naming Service so that server objects need not be tarted unnecessarily at system startup time. In the preferred mode, the work station is an industry compatible personal computer running a commercially available browser operating under a common operating system which may be Windows or other suitable operating system. The client work station is coupled, via the internet, to a CORBA server adapter. The CORBA interface communicates through middleware. This middleware permits the user work station to communicate with the XATMI enterprise server as with other dedicated user terminals.

The CORBA adapter makes the interface to the client terminal appear as the distributed CORBA architecture. The CORBA adapter interfaces with the gateway which causes the CORBA client terminal appear to be a dedicated user terminal to the OLTP enterprise server. The actual connection is made through normal network facilities.

The middleware provides buffering for the transaction permitting the CORBA client terminal to resume normal activity between transmitting the transaction request and the receipt of the service response. The enterprise sever application also does not need be available at the time of a transaction request. Rather than tie up the user work station until a communication time-out occurs, the user work station can perform other tasks, including making additional transaction requests.

The present invention provides a way to direct requests from a CORBA client to XATMI services. Because direct communication is possible, performance is improved as compared to systems that utilize gateway servers.

In accordance with the preferred mode of the present invention, the CORBA Naming Service is configured in such a way that no CORBA objects need be initialized at server start up, but need be initiated only as needed. Unlike the prior art approaches, this tends to conserve resources at both system start up and during run time.

The Naming Service builds a list describing the various objects within the system. Before a program makes a call to, or "activates" an object, it makes a call to the Naming Service to obtain information about the object. This information, which is stored in an "object reference", includes an object's interface name and other information about the object, including its IP address. After this information concerning an object is obtained by retrieving an object's object reference, the calling program may activate the object with a request. Therefore, in cases wherein only a small fraction of all objects are ever activated, only a small fraction of the needed memory and other resources are needed.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

The detailed descriptions which follow are presented largely in terms of algorithms and symbolic representations of operations on data bits within a computer memory. These algorithmic descriptions and representations are the means used by those skilled in the data processing arts to most effectively convey the substance of their work to others skilled in the art.

An algorithm is here, generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers or the like. It should be kept in mind, however, that all of these and similar terms are to be associated with the appropriate physical quantities and are merely convenient labels applied to these quantities.

Furthermore, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar devices. In all cases, it should be kept in mind the distinction between the method operations in operating a computer and the method of computation itself. The present invention related to method steps for operating a computer in processing electrical or other (e.g., mechanical, chemical) physical signals to generate other desired physical signals.

The present invention also relates to apparatus for performing these operations. This apparatus may be specially constructed for the required purposes or it may comprise a general purpose computer as selectively activated or reconfigured by a computer program stored in the computer. The algorithms present herein are not inherently related to a particular computer system or other apparatus. In particular, various general purpose computer systems may be used with computer programs written in accordance with the teachings of the present invention, or it may prove more convenient to construct more specialized apparatus, to perform the required method steps. The required structure for such machines will be apparent from the description given below.

Figure 1:
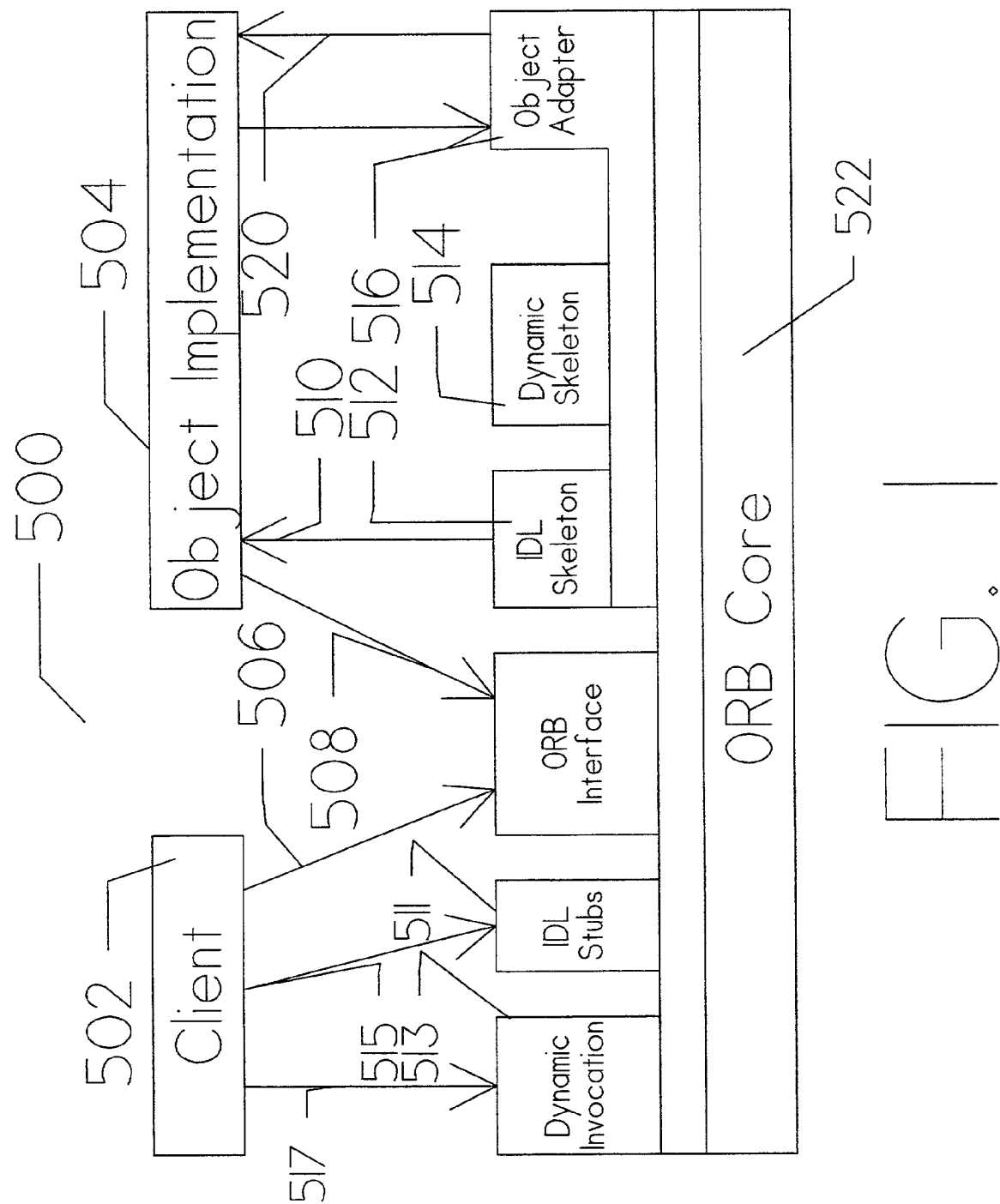
FIG. 1 is a functional block diagram of the Object Request Broker (ORB) of the CORBA computing environment.

FIG. 1 is a functional block diagram of Object Request Broker 500 of the Object Management Group's Common Object Request Broker Architecture (CORBA). The Object Request Broker (ORB) is the central component of the CORBA structure. It contains all of the facilities necessary to identify and locate objects; handle connection management; and deliver data. ORB is responsible for properly transferring all requests.

The basic functionality provided by the ORB consists of passing the request from Client 502 to Object Implementation 504 on which it is invoked. In order to make a request the client can communicate with ORB Core 522 through IDL Stubs 511 or through Dynamic Invocation 513. The stub represents the mapping between the language of implementation of the client and ORB Core 522. Thus the client can be written in any language as long as the implementation of ORB 500 supports this mapping. ORB Core 522 then transfers the request to Object Implementation 504 which receives the request as an up-call through either IDL Skeleton 512 or Dynamic Skeleton 514. The communication between Object Implementation 504 and ORB Core 522 is effected by Object Adapter 516. Further detail concerning operation of the CORBA Object Request Broker of the present invention is provided below in accordance with the discussion of FIG. 6.

Figure 2:
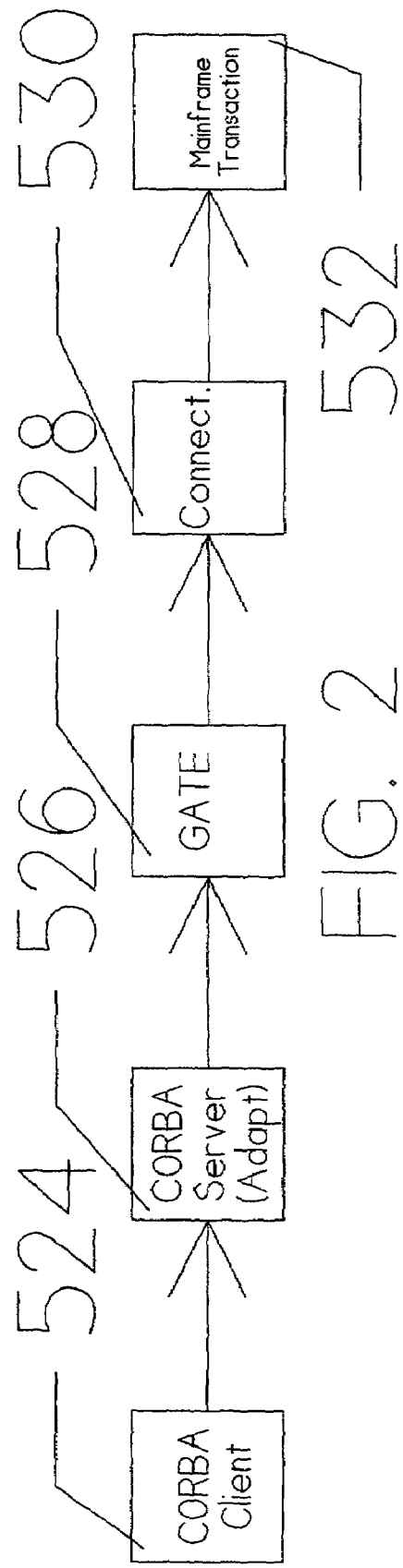
FIG. 2 is a functional block diagram showing the major components of the previous approach.

FIG. 2 is a functional block diagram of the major components of the previous approach to providing CORBA access to XATMI applications. CORBA Client 524 requests a service of the OLTP enterprise server utilizing the CORBA protocol. The request is forwarded to CORBA Server 526 which communicates with CORBA Client 524 in accordance with the CORBA protocol and transfers the request to Gate 528. It is Gate 528 which essentially converts the request from free standing CORBA Client 524 to functionally resemble the dedicated user terminal expected by the OLTP enterprise server.

Gate 528 interfaces with Connector 530 for transmission of the request to Mainframe Transaction 532. Preferably this transfer is in accordance with HTP/ic protocol. Mainframe Transaction 532 processes the request in due course in accordance with its other priorities. The response to the request, if any, is transferred to CORBA Client 524 in the reverse order as available.

Figure 3:
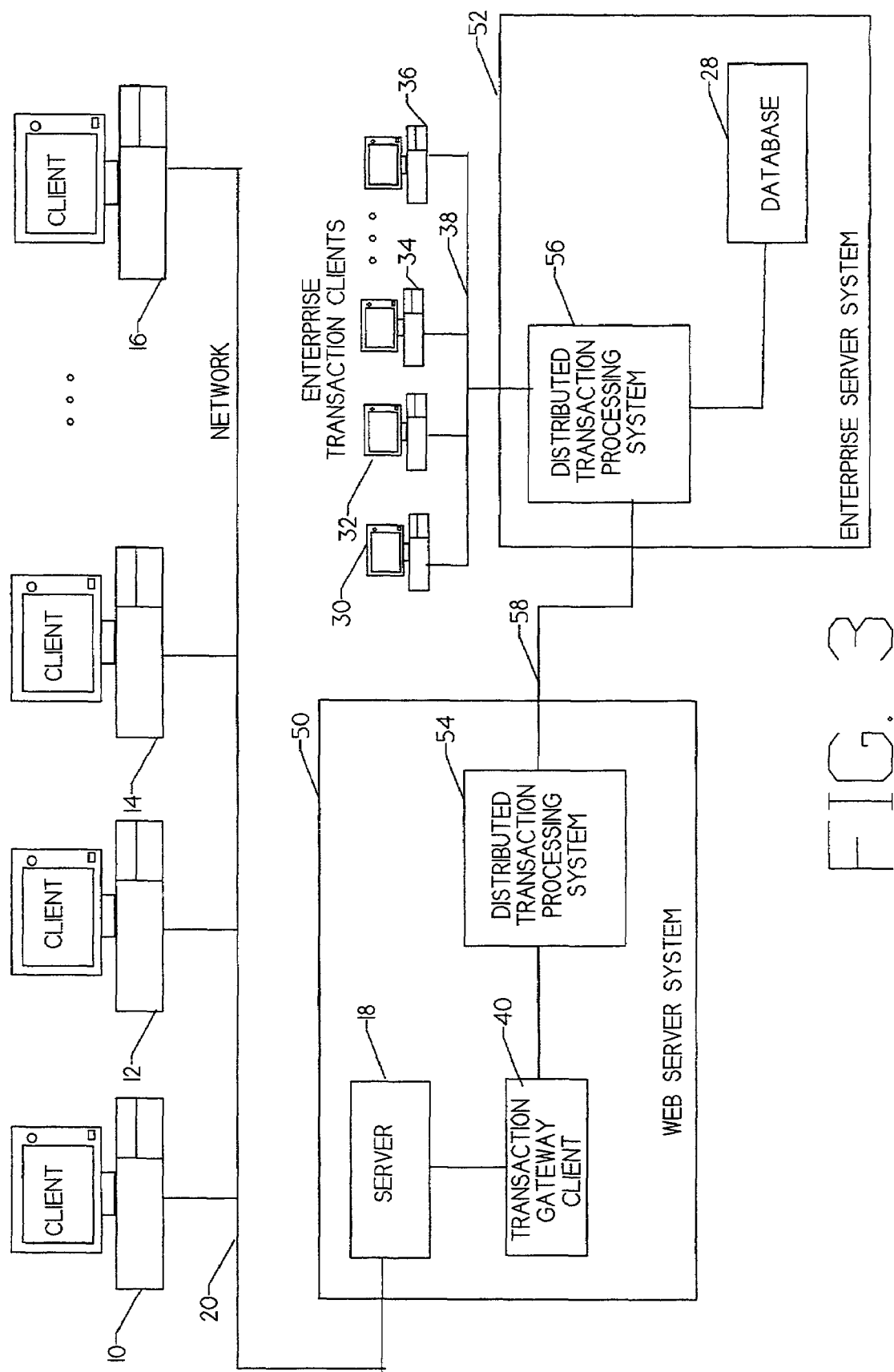
FIG. 3 is a block diagram of a typical hardware/software environment employing the present invention.

FIG. 3 is a functional block diagram of a generalized computing environment in which the present invention could be used to make an enterprise based transaction processing system interoperable with a PC/Workstation based requester employing the CORBA protocol. A plurality of PC/Workstations, designated as Clients 10, 12, 14, and 16 are coupled to a Server 18 via Network 20. The Network 20 may be an internal local area network or the Internet.

Each of the Clients 10, 12, 14 and 16, is a Personal Computer/Workstation having operating system software and application software designed to provide Graphical User Interface (GUI) and communications capabilities which enable the Client to communicate with an associated Server application 18 via a Network 20. This communication employs the CORBA protocol. Therefore, Clients 10, 12, 14, and 16 may operate under Windows or any number of other suitable operating systems.

The Workstation Server System 50 may be any class of machine(s) which are capable of running a Server application 18 accommodating CORBA along with a Distributed Transaction Processor 54. The Transaction Processing system 54 is designated as Distributed to make clear that a transaction is formatted on the Workstation Server System 50 and forwarded to the Enterprise Server system 52 for processing. The exemplary Enterprise Server System 52 is a 2200 Series data processing system from Unisys and also includes a Distributed Transaction Processing System 56. The Distributed Transaction Processing System 56 is intended to encompass the same functionality as a monolithic transaction processing system, however, it is designated as Distributed to be compatible with the Distributed Transaction Processing System 54. The exemplary Distributed Transaction Processing Systems 54 and 56 are intended to encompass transaction manager software, such as Open/OLTP Transaction Manager software from Unisys, and user implemented Open/OLTP services. The Distributed Transaction Processing System 54 and the Distributed Transaction Processing System 56 are coupled via Network 58. Preferably, the network interface for Network 58 is separate from the network interface for Network 20.

The Distributed Transaction Processing System 56 serves data from the Database 28 to the Transaction Clients 30, 32, 34, and 36. The Transaction Clients 30,32,34, and 36 are coupled to the Distributed Transaction Processing System 56 via line 38, of which the underlying technology is driven by the application of the Distributed Transaction Processing System 56.

The Transaction Gateway Client 40 allows the Server 18 to interoperate with the Transaction Processing System. When a Client 10, 12, 14 or 16 selects an enterprise based service, the CORBA request is routed to the Server 18, which in turn routes the request to the Transaction Gateway Client 40. The Transaction Gateway Client 40 determines the requested service and forwards the necessary information to the Distributed Transaction Processing System 54 and 56. The Distributed Transaction Processing System 54 and 56 processes the request against the Database 28 according to the specified request (e.g., select, update, delete). The Distributed Transaction Processing System 54 and 56 returns data and/or status information to the Transaction Gateway Client 40, which in turn formats the data in an appropriate manner for the Server 18. The Server 18 then returns the information to the requesting CORBA Client 10, 12, 14, and 16.

Figure 4:
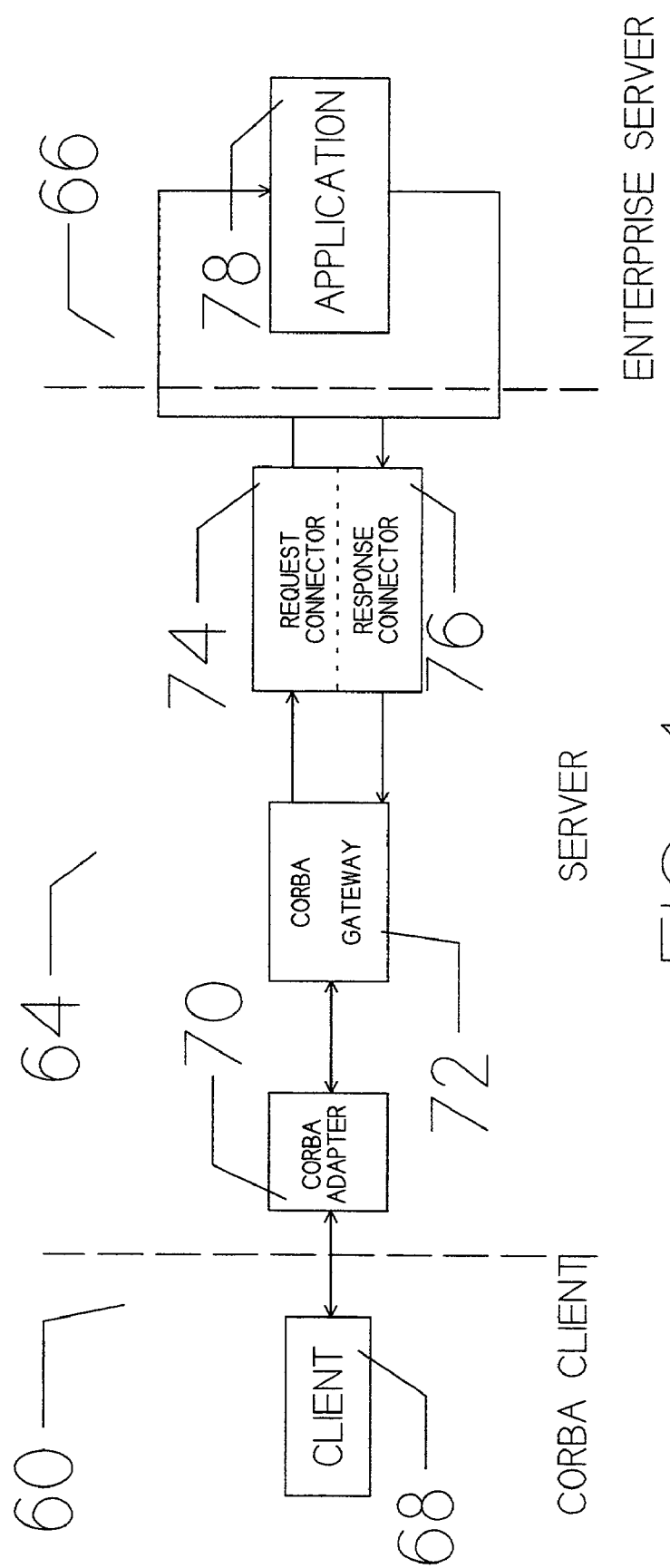
FIG. 4 is a functional block diagram showing data flow of the previous approach.

FIG. 4 is a functional diagram showing data flow through the major components of the previous approach utilizing a CORBA gateway. For explanatory purposes, the system may be divided into three regions. CORBA Client 68 is located within CORBA Client region 60. This represents the user, operating a user terminal, or work station. The user terminal is preferably an industry standard personal computer having a CORBA compatible operating system, which may or may not be Windows based, and a commercially available web browser through which the user communicates with the Server of region 64.

The Server is preferably a CORBA based server having an industry compatible standardized architecture. Hosted on the Server is CORBA Adapter 70. The nature of CORBA Adapter 70 is discussed in greater detail below. However, it permits standardized CORBA based communication from CORBA Client region 60 to couple to existing enterprise server applications.

Necessary to the practice of this approach is CORBA Gateway 72, which provides the logic for formatting and transferring requests from and responses to the CORBA environment. Through this gateway operating with CORBA Adapter 70, the CORBA client can request and receive messages which utilize any CORBA supported format including html, java, c-client, vb-client, etc. The data transfers at this point are in standard view format.

Request Connector path 74 actually transfers the request messages to be made available to Application 78. Application 78 of the enterprise server located in Enterprise Server region 66, transfers response messages to Response Connector path 76 for transmission to Client 68. CORBA Gateway 72 manages the data flow through the single connector consisting of Request Connector path 74 and Response Connector path 76.

When client 68 makes a request, it is transferred using CORBA protocol to CORBA Adapter 70 and transferred for servicing to Application 78 via Request Connector path 74. The response, if any, is transferred from Application 78 via Response Connector 76 path to CORBA Gateway 72. The response is converted to CORBA format and transferred to Client 68 in CORBA protocol by CORBA adapter 70.

Figure 5:
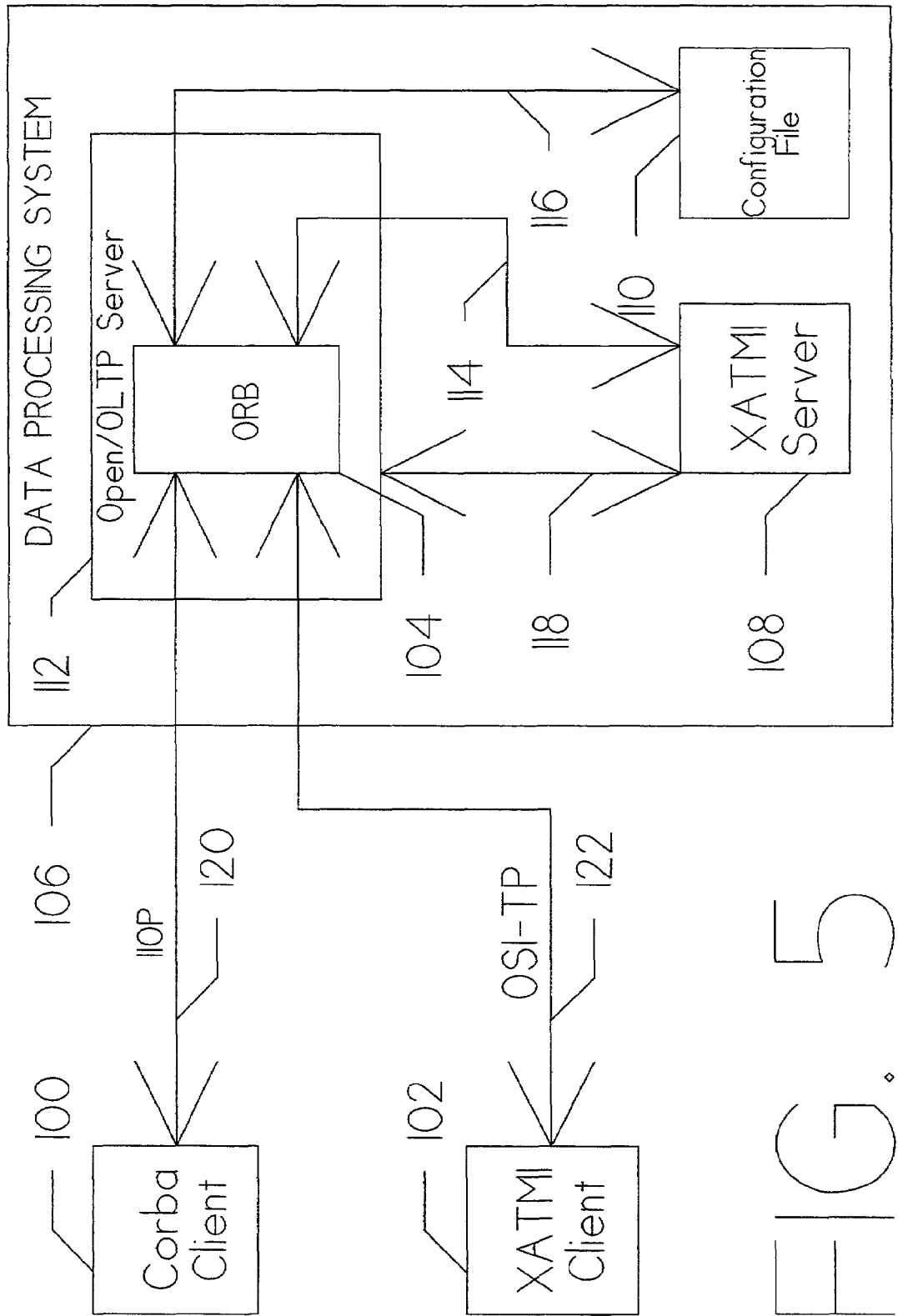
FIG. 5 is a diagram showing the relationship of the key run time software components of the present invention.

FIG. 5 is a system block diagram showing the preferred mode of the present invention. Open/OLTP 112 resides within a data processing system 106, such as a Model 2200 system commercially available from Unisys Corporation. XATMI client 102 calls services within Open/OLTP 112 using standard OSI-TP communication protocol via path 122. These requests are forwarded for processing by XATMI server 108 via path 118. These requests do not require any conversion because they are already in the format used by the XATMI services.

In contrast to XATMI client 102, CORBA client 100 makes requests in Integrated Input Output Protocol (IIOP) using an IIOP communications protocol. These requests cannot be forwarded directly to XAMTI 108 for processing because they are not in the correct format. As explained above, these requests may be intercepted by a CORBA server that reformats the requests into OSI-TP communications protocol to resemble requests from XATMI client 102. However, processing requests in this manner tends to degrade performance.

In accordance within the preferred mode, these requests are forwarded via path 120 directly to CORBA Object Request Broker (ORB) 104 within Open/OLTP server 112. ORB 104 reformats the requests dynamically as the requests are passed to XATMI server 18 via path 114 such that little performance impact is associated with this translation.

Figure 6:
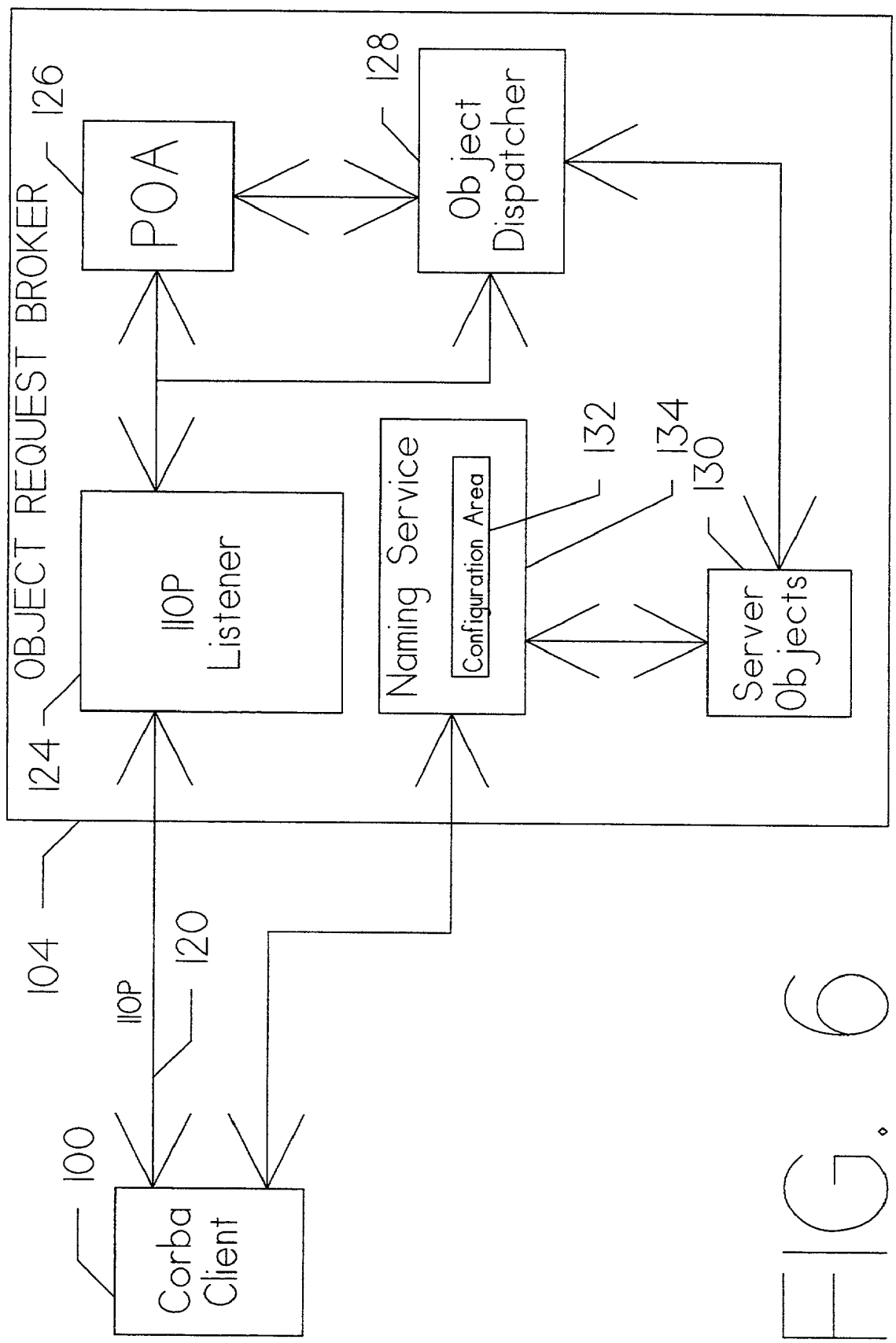
FIG. 6 is a detailed diagram showing the operation of the CORBA Object Request Broker of the present invention.

FIG. 6 is a detailed diagram showing the operation of the Object Request Broker 104 of the preferred mode of the present invention. CORBA Client 10 first makes a request to Naming Service 234, as shown, to obtain an object reference from configuration area 132. The object reference is a data structure that contains information about the object that is to be called, including the interface name. After the object reference is returned to the client, the interface name retrieved from the object reference may be used to activate the object. This is accomplished by providing a message to IIOP Listener 124. The message is forwarded to Object Dispatcher 128, which directs the request to the server objects 130. The request is then processed by the object having the specified interface name.

Naming Service 134 can only obtain an object reference after a respective object has been activated for the first time. This allows the objects to bind the object references to the Naming Services, as shown. With the prior approach, all objects were so activated at system initiation. As a result, large amounts of memory were allocated to activate all of the objects in the system, many of which were not ever needed or referenced.

The current invention makes such activating each of the objects in the system unnecessary. During configuration of the system at initialization time, an object reference is created automatically for each of the objects. These object references are then inserted into configuration area 132. Each of the object references includes the interface name of the object, security requirements associated with the object, and an IP address indicating where the object is located within the system. As a result, objects do no have to be activated unnecessarily, and system resources are conserved.

Figure 7:
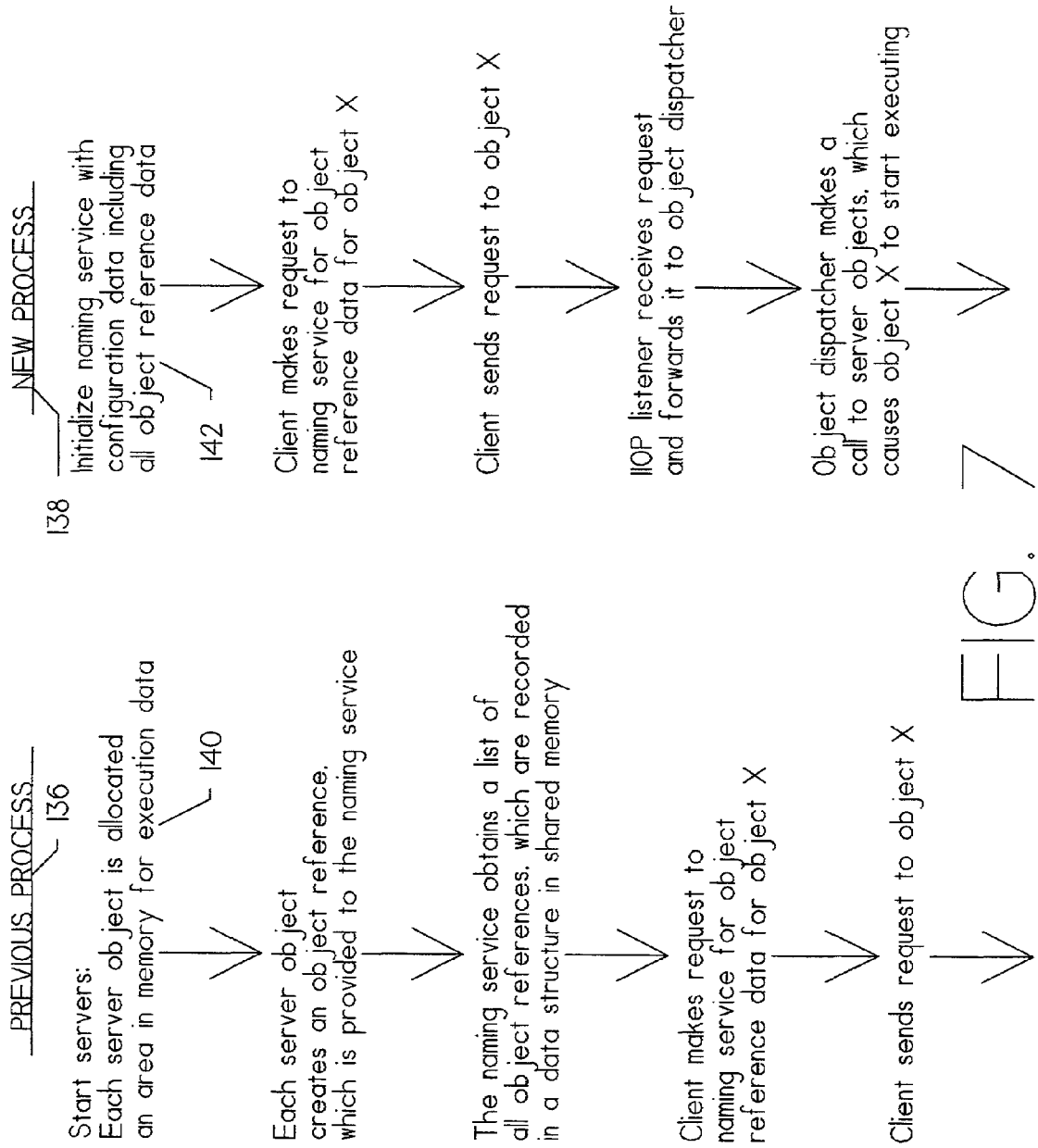
FIG. 7 is a side by side comparison of the process of initialization and utilization of CORBA objects.

FIG. 7 is a side by side comparison between the previous approach 136 and the new process 138. Though the comparison tends to be self explanatory, it is important to note the differences between the initial steps 140 and 142. In accordance with the previous process 136, initial step 140 requires activation and therefore, memory allocated for execution of each object on the server. With previous process 136, the object reference is not created and provided to the naming service until the second step.

With new process 138, the first step is to initialize the naming service with configuration data. This substitutes for activation of each of the objects, because it provides all of the information need to activate an object should a client ever request its use. Therefore, activation of any particular object does not begin until the second step during which a client is actually requesting use of the corresponding object.

Having thus described the preferred embodiments of the present invention, those of skill in the art will readily appreciate that the teachings found herein may be applied to yet other embodiments within the scope of the claims hereto attached.

We claim:

1. A data processing system comprising:
   a. a user terminal for entering a transaction request in CORBA (Common Object Request Broker Architecture) protocol;
   b. an enterprise server communicating via a non-CORBA protocol for responding to said transaction request using an XATMI (Extended Application Transaction Module Interface) application responsively coupled to said user terminal via a publicly accessible digital data communication network;
   c. a server containing middleware having a CORBA adapter which is responsively coupled intermediate said enterprise server and said user terminal to appear as a distributed CORBA architecture to said user terminal and having a gateway responsively coupled to said adapter and enterprise server which causes said user terminal to appear to be a dedicated user terminal and having an object request broker for referencing a plurality of CORBA objects located within said server, which activates one of said plurality of CORBA objects if and only if needed to respond to said transaction request and which buffers said transaction request until a response is provided thereby permitting said user terminal to resume normal activity;

d. said object request broker further comprises a configuration area containing a plurality of object references wherein each of said plurality of object references corresponds to a different one of said plurality of CORBA objects; and e. said plurality of object references is prepared by said server upon server initialization.

2. A data processing system according to claim 1 wherein said object reference broker further comprises a naming service which contains said configuration area.

3. A data processing system according to claim 2 wherein said user terminal transfers said transaction request in IIOP (Integrated Input/Output Protocol) protocol.

4. An apparatus comprising:
a. A user terminal which generates a service request requiring use of a CORBA (Common Object Request Broker Architecture) object;
b. A publicly accessible digital data communication network responsively coupled to said user terminal;
c. A server responsibly coupled to said publicly available digital data communication network which responds to said service request using an XATMI (Extended Application Transaction Module Interface) application;
d. middleware having a gateway responsively coupled to said server which causes said user terminal to appear to be a dedicated user terminal and having an object request broker which activates said COBRA object upon receipt of said service request and which buffers said service request until a response is provided thereby permitting said user terminal to resume normal activity;
e. said object request broker further comprises a configuration area containing activation information concerning said CORBA object; and
f. said activation information concerning said CORBA object is placed into said configuration area upon server initiation.

5. The apparatus according to claim 4 wherein said service request further comprises IIOP (Integrated Input/Output Protocol) protocol.

6. The apparatus according to claim 5 wherein said user terminal further comprises an industry compatible personal computer.

7. A method of processing a service request comprising:
a. Composing a service request requiring use of a CORBA (Common Object Request Broker Architecture) object in a user terminal;
b. Transmitting said service request via IIOP (Integrated Input/Output Protocol) protocol;
c. Receiving said service request in a server;
d. Activating said CORBA object in response to receiving said service request;
e. Buffering said service request until a response is provided thereby permitting said user terminal to resume normal activity and permitting said server to honor said service request as if said user terminal were an XATMI user terminal;
f. wherein said activating step further comprises accessing object configuration information from a naming service located within said server; and
a storing said object configuration information within a configuration area of said naming service upon server initiation.

8. The method according to claim 7 further comprising: Preparing said response in said server.

9. The method according to claim 8 further comprising: Transferring said response to said user terminal.

10. An apparatus comprising:
a. generating means for generating a service request requiring use of a CORBA (Common Object Request Broker Architecture) object;
b. transferring means responsively coupled to said generating means for transferring of said service request via a publicly accessible digital data communication network;
c. activating means responsively coupled to said publicly accessible digital data communication network for activating said CORBA object in response to receipt of said service request;
d. honoring means responsively coupled to said activating means for honoring said service request;
e. buffering means for buffering said service request until said honoring means honors said service request thereby permitting said user terminal to resume normal activity;
f. said activating means further comprises a configuration area containing a plurality of object references wherein each of said plurality of object references corresponds to a different one of a plurality of CORBA objects; and
G. said plurality of object references is prepared by said honoring means upon initialization.

11. The apparatus according to claim 10 wherein said honoring means further comprises an enterprise server having an XATMI (Extended Application Transaction Module Interface) application.

12. The apparatus according to claim 11 wherein said honoring means further comprises means for producing a response corresponding to said service request.

13. The apparatus according to claim 12 wherein said publicly accessible digital data communication network is the Internet.

14. The apparatus according to claim 13 wherein said honoring means further comprises a commercially available mainframe system.

* * * * *